United States Patent
Fujita et al.

(10) Patent No.: US 9,863,314 B2
(45) Date of Patent: Jan. 9, 2018

(54) CARBON DIOXIDE MEMBRANE SEPARATION SYSTEM IN COAL GASIFICATION PROCESS, AND INTEGRATED COAL GASIFICATION COMBINED CYCLE POWER GENERATION FACILITY USING SAME

(75) Inventors: Suguru Fujita, Osaka (JP); Ken-ichi Sawamura, Osaka (JP); Masanobu Aizawa, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 1063 days.

(21) Appl. No.: 14/112,650

(22) PCT Filed: Apr. 19, 2012

(86) PCT No.: PCT/JP2012/060608
§ 371 (c)(1),
(2), (4) Date: Jan. 29, 2014

(87) PCT Pub. No.: WO2012/147618
PCT Pub. Date: Nov. 1, 2012

(65) Prior Publication Data
US 2014/0190146 A1    Jul. 10, 2014

(30) Foreign Application Priority Data
Apr. 28, 2011  (JP) ................ 2011-101729

(51) Int. Cl.
*F02C 3/22* (2006.01)
*B01D 53/22* (2006.01)
(Continued)

(52) U.S. Cl.
CPC ............... *F02C 3/22* (2013.01); *B01D 53/22* (2013.01); *B01D 53/228* (2013.01);
(Continued)

(58) Field of Classification Search
CPC ............. F02C 3/22; B01D 53/22; C01B 3/12
See application file for complete search history.

(56) References Cited

U.S. PATENT DOCUMENTS

| | | | |
|---|---|---|---|
| 8,713,907 B2 * | 5/2014 | Kidambi | F01K 23/068 55/315 |
| 2008/0147241 A1 | 6/2008 | Tsangaris et al. | |

(Continued)

FOREIGN PATENT DOCUMENTS

| | | |
|---|---|---|
| JP | 05-322112 A | 12/1993 |
| JP | 09-279163 A | 10/1997 |

(Continued)

OTHER PUBLICATIONS

International Search Report dated Jun. 5, 2012, issued for PCT/JP2012/060608.

*Primary Examiner* — Janie Loeppke
(74) *Attorney, Agent, or Firm* — Locke Lord LLP

(57) ABSTRACT

The carbon dioxide membrane separation system in a coal gasification process contains introduction of a mixed gas of hydrogen ($H_2$) and carbon dioxide ($CO_2$) in a high temperature and high pressure condition generated through water gas shift reaction from a water gas shift reaction furnace, while maintaining the temperature and pressure condition, to a zeolite membrane module containing a zeolite membrane for removing carbon dioxide, thereby removing carbon dioxide and generating a fuel gas rich in hydrogen. The fuel gas rich in hydrogen in a high temperature and high pressure condition discharged from the zeolite membrane module is fed to a gas turbine of the power generation facility while maintaining the temperature and pressure condition.

7 Claims, 1 Drawing Sheet

(51) Int. Cl.
*B01D 71/02* (2006.01)
*F02C 3/28* (2006.01)
*F02C 7/22* (2006.01)
*C10J 3/00* (2006.01)
*C01B 3/12* (2006.01)
*B01D 69/14* (2006.01)
*C10J 3/82* (2006.01)
*C10K 1/00* (2006.01)
*C10K 3/04* (2006.01)

(52) U.S. Cl.
CPC ......... *B01D 69/147* (2013.01); *B01D 71/028* (2013.01); *C01B 3/12* (2013.01); *C10J 3/00* (2013.01); *C10J 3/82* (2013.01); *F02C 3/28* (2013.01); *F02C 7/22* (2013.01); *C01B 2203/042* (2013.01); *C01B 2203/0475* (2013.01); *C01B 2203/84* (2013.01); *C10J 2300/1618* (2013.01); *C10J 2300/1653* (2013.01); *C10K 1/005* (2013.01); *C10K 3/04* (2013.01); *F05D 2220/722* (2013.01); *Y02E 20/16* (2013.01); *Y02E 20/18* (2013.01); *Y02P 20/152* (2015.11)

(56) References Cited

U.S. PATENT DOCUMENTS

2010/0260657 A1 10/2010 Niitsuma et al.
2011/0139047 A1 6/2011 Takase et al.

FOREIGN PATENT DOCUMENTS

| JP | 2000-319672 A | 11/2000 | |
|----|---------------|---------|---|
| JP | 2009-029676 A | 2/2009 | |
| JP | 2009-536260 A | 10/2009 | |
| JP | 2010-059940 A | 3/2010 | |
| JP | 2010-214324 A | 9/2010 | |
| NL | WO 2010112500 A1 * | 10/2010 | ........... B01D 53/002 |

* cited by examiner

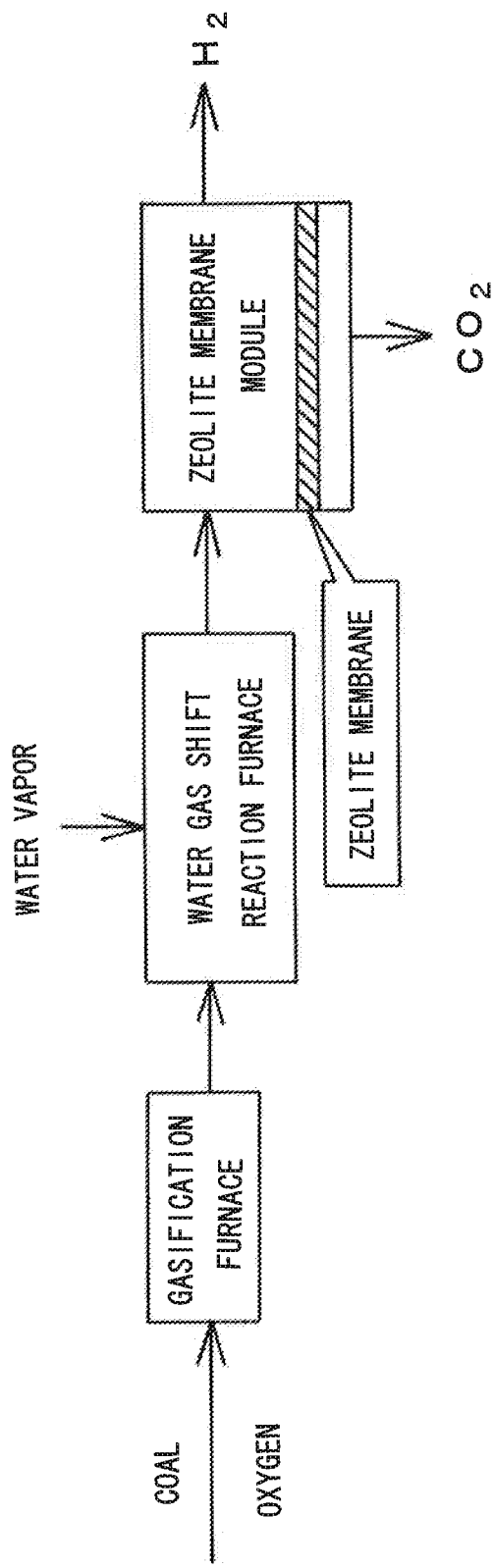

CARBON DIOXIDE MEMBRANE SEPARATION SYSTEM IN COAL GASIFICATION PROCESS, AND INTEGRATED COAL GASIFICATION COMBINED CYCLE POWER GENERATION FACILITY USING SAME

TECHNICAL FIELD

The present invention relates to a carbon dioxide membrane separation system in a coal gasification process, and an integrated coal gasification combined cycle power generation facility using the same.

BACKGROUND ART

Coal has been used as an electric power generation fuel, and the attention on the power generation method therewith is transferred from a pulverized coal combustion boiler power generation, which is an ordinary method, to an integrated coal gasification combined cycle (IGCC) power generation facility, which has good efficiency and is excellent in environmental conservation. In an integrated, coal gasification combined cycle (IGCC) power generation facility, coal as a fuel is gasified for operating a gas turbine, and electric power generation is performed by utilizing the driving power of the gas turbine and the waste heat from the gas turbine. Accordingly, gasification techniques for converting coal to gas have been actively developed in various fields (see, for example, PTL 1 and PTL 2).

On using coal as an electric power generation fuel, finely pulverized coal is introduced firstly to a pyrolysis furnace. In the pyrolysis furnace, coal is pyrolyzed by mixing with a high temperature gas generated in a high temperature gas generation furnace, and thereby a pyrolyzed gas, an oil and a char are formed as pyrolyzed products. The char thus formed is separated from the gas and the oil with a cyclone. The whole or a part of the char thus separated is gasified (partial oxidation) with oxygen gas in a high temperature gas generation furnace (gasification furnace) and thus is converted to a high temperature gas (which contains hydrogen and carbon monoxide as major components). The high temperature gas is then introduced to a water gas shift reaction furnace, and carbon monoxide is converted to hydrogen and carbon dioxide by a water gas shift reaction according to the following scheme (1). Furthermore, carbon dioxide is removed from the reaction gas, and thus a fuel gas rich in hydrogen is generated.

$$CO + H_2O = CO_2 + H_2 \quad (1)$$

In the gasification furnace and the water gas shift reaction furnace for purifying the fuel gas ($H_2$) for the gas turbine, the fuel gas after the reaction contains hydrogen ($H_2$) and also the equimolar amount of carbon dioxide ($CO_2$).

The fuel gas containing carbon dioxide ($CO_2$) has been ordinarily fed to the gas turbine in some cases, but in recent years, carbon dioxide ($CO_2$) is removed by an absorption process in most cases. Such a separation membrane is also proposed that can be utilized for removing carbon dioxide contained in the gas after reaction (see, for example, PTL 3).

CITATION LIST

Patent Literature

PTL 1: JP-A-2000-319672
PTL 2: JP-A-2010-59940
PTL 3: JP-A-2010-214324

SUMMARY OF INVENTION

Technical Problem

In the ordinary absorption process, however, it is necessary to regenerate the absorbent after absorbing carbon dioxide ($CO_2$), and thermal energy for vaporizing carbon dioxide ($CO_2$) is required for the regeneration. In the carbon dioxide gas separation membrane described in PTL 3, the feed gas temperature is determined 20° C. or more and 200° C. or less from the standpoint of the separation performance, and thus a heat exchanger is necessarily provided for lowering the gas temperature before feeding to the membrane. In any case, the gas temperature on the gasification is approximately from 200 to 400° C., and it is advantageous in view of thermal efficiency that the gas is fed as it is to the gas turbine, but there is a problem that the gas is necessarily cooled for separating carbon dioxide ($CO_2$) for enrichment of the fuel.

An object of the invention is to solve the problem in the ordinary art and to provide a carbon dioxide membrane separation system in a coal gasification process, capable of enriching a fuel gas formed by gasification of coal, by separating carbon dioxide ($CO_2$) therefrom while maintaining the high temperature thereof, without a regeneration step of an absorbent, which is required in an ordinary carbon dioxide absorption process, and feeding the fuel gas to a gas turbine, and to provide an integrated coal gasification combined cycle power generation facility using the same.

Solution to Problem

For achieving the aforementioned objects, the invention a carbon dioxide membrane separation system in a coal gasification process according to claim 1 contains introduction of a mixed gas of hydrogen ($H_2$) and carbon dioxide ($CO_2$) in a high temperature and high pressure condition generated through water gas shift reaction from a water gas shift reaction furnace, while maintaining the temperature and pressure condition, to a zeolite membrane module containing a zeolite membrane for removing carbon dioxide, thereby removing carbon dioxide and generating a fuel gas rich in hydrogen.

The invention of claim 2 is an integrated coal gasification combined cycle power generation facility containing the carbon dioxide membrane separation system in a coal gasification process according to claim 1, wherein the fuel gas rich in hydrogen in a high temperature and high pressure condition discharged from the zeolite membrane module is fed to a gas turbine of the power generation facility while maintaining the temperature and pressure condition.

The invention of a carbon dioxide membrane separation system in a coal gasification process according to claim 3 contains plural fuel gas generation and carbon dioxide separation units connected continuously, each of which contains the water gas shift reaction furnace and the zeolite membrane module containing a zeolite membrane for removing carbon dioxide according to claim 1, by which an unreacted raw material gas contained in the fuel gas rich in hydrogen generated in the respective units is reacted in the water gas shift reaction furnace in the next unit, and carbon dioxide formed in the units is recovered.

The invention of claim 4 is an integrated coal gasification combined cycle power generation facility containing the carbon dioxide membrane separation system in a fuel gas production process according to claim 3, wherein the fuel gas rich in hydrogen in a high temperature and high pressure condition discharged from the zeolite membrane module of the fuel gas generation and carbon dioxide separation unit of the final step is fed to a gas turbine of the power generation facility while maintaining the temperature and pressure condition.

Advantageous Effects of Invention

The invention of a carbon dioxide membrane separation system in a coal gasification process according to claim 1 contains introduction of a mixed gas of hydrogen ($H_2$) and carbon dioxide ($CO_2$) in a high temperature and high pressure condition generated through water gas shift reaction from a water gas shift reaction furnace, while maintaining the temperature and pressure condition, to a zeolite membrane module containing a zeolite membrane for removing carbon dioxide, thereby removing carbon dioxide and generating a fuel gas rich in hydrogen. According to the invention of claim 1, such advantageous effects are provided that the invention does not require gas cooling (heat exchanger) for removing carbon dioxide ($CO_2$) in an ordinary carbon dioxide absorption process and a regeneration process of an absorbent necessary in the carbon dioxide absorption process, and is capable of enriching a fuel gas formed through gasification of coal by separating carbon dioxide ($CO_2$) still at a high temperature and feeding the fuel gas to a gas turbine.

The invention of claim 2 is an integrated coal gasification combined cycle power generation facility containing the carbon dioxide membrane separation system in a coal gasification process according to claim 1, wherein the fuel gas rich in hydrogen in a high temperature and high pressure condition discharged from the zeolite membrane module is fed to a gas turbine of the power generation facility while maintaining the temperature and pressure condition. According to the invention of claim 2, such advantageous effects are provided that the invention makes efficient use of energy and largely reduces the power generation cost with a coal fuel.

The invention of a carbon dioxide membrane separation system in a coal gasification process according to claim 3 contains plural fuel gas generation and carbon dioxide separation units connected continuously, each of which contains the water gas shift reaction furnace and the zeolite membrane module containing a zeolite membrane for removing carbon dioxide according to claim 1, by Which an unreacted raw material gas contained in the fuel gas rich in hydrogen generated in the respective units is reacted in the water gas shift reaction furnace in the next unit, and carbon dioxide formed in the units is recovered. According to the invention of claim 3, such advantageous effects are provided that the invention does not require gas cooling (heat exchanger) for removing carbon dioxide ($CO_2$) in an ordinary carbon dioxide absorption process and a regeneration process of an absorbent necessary in the carbon dioxide absorption process, and enhances the reaction conversion of the water gas shift reaction by the plural combinations connected continuously, each of which contains the water gas shift reaction furnace and the zeolite membrane module containing a zeolite membrane for removing carbon dioxide. Furthermore, the invention is capable of enriching a fuel gas formed through gasification of coal by separating carbon dioxide ($CO_2$) still at a high temperature and feeding the fuel gas to a gas turbine.

The invention of claim 4 is an integrated coal gasification combined cycle power generation facility containing the carbon dioxide membrane separation system in a fuel gas production process according to claim 3, wherein the fuel gas rich in hydrogen in a high temperature and high pressure condition discharged from the zeolite membrane module of the fuel gas generation and carbon dioxide separation unit of the final step fed to a gas turbine of the electric power generation facility while maintaining the temperature and pressure condition. According to the invention of claim 4, such advantageous effects are provided that the invention makes efficient use of energy and largely reduces the power generation cost with a coal fuel.

BRIEF DESCRIPTION OF DRAWINGS

FIG. 1

The FIGURE is a flow chart showing a carbon dioxide membrane separation system in a fuel gas production process according to the invention.

DESCRIPTION OF EMBODIMENTS

Embodiments of the invention will be described with reference to the drawing, but the invention is not limited thereto.

On using coal as an electric power generation fuel, finely pulverized coal is introduced firstly to a pyrolysis furnace (which is not shown in the FIGURE). In the pyrolysis furnace, coal is pyrolyzed by mixing with a high temperature gas generated in a high temperature gas generation furnace, and thereby a pyrolyzed gas, an oil and a char are formed as pyrolyzed products. The char thus formed is separated from the gas and the oil with a cyclone.

As shown in FIG. 1, the whole or a part of the char thus separated is gasified (partial oxidation) with oxygen gas in a high temperature gas generation furnace (gasification furnace) and thus is converted to a high temperature gas (which contains hydrogen and carbon monoxide as major components). The high temperature gas is then introduced to a water gas shift reaction furnace, and carbon monoxide is converted to hydrogen and carbon dioxide according to the following scheme (1).

$$CO+H_2O=CO_2+H_2 \qquad (1)$$

The fuel gas after the reaction contains hydrogen ($H_2$) and also the equimolar amount of carbon dioxide ($CO_2$).

In the carbon dioxide membrane separation system in a coal gasification process according to the invention, a mixed gas of hydrogen ($H_2$) and carbon dioxide ($CO_2$) in a high temperature and high pressure condition generated through water gas shift reaction, from a water gas shift reaction furnace is introduced, while maintaining the temperature and pressure condition, to a zeolite membrane module containing a zeolite membrane for removing carbon dioxide, thereby removing carbon dioxide and generating a fuel gas rich in hydrogen.

The language "while maintaining the temperature and pressure condition" herein means that a device for gas cooling is not used, and does not exclude decrease of the temperature or pressure due to spontaneous heat radiation or the like.

According to the carbon dioxide membrane separation system in a coal gasification process of the invention, gas cooling (heat exchanger) for removing carbon dioxide ($CO_2$) in an ordinary carbon dioxide absorption process is not required, a regeneration process of an absorbent necessary in the carbon dioxide absorption process is not used, and the fuel gas formed through gasification of coal may be enriched by separating carbon dioxide ($CO_2$) still at a high temperature and may be fed to a gas turbine.

In the integrated coal gasification combined cycle power generation facility containing the carbon dioxide membrane separation system in a coal gasification process of the invention, the fuel gas rich in hydrogen in a high temperature and high pressure condition discharged from the zeolite membrane module is fed to a gas turbine of the power generation facility while maintaining the temperature and pressure condition.

The electric power generation method of the power generation facility is preferably, for example, combined cycle power generation (including both a gas turbine and a steam turbine), which is easily transferred to a low load operation and exhibits a high power generation efficiency thereon.

According to the integrated coal gasification combined cycle power generation facility of the invention, energy may be efficiently used, and the power generation cost with a coal fuel may be largely reduced.

The carbon dioxide membrane separation system in a coal gasification process of the invention contains from 2 to 5, preferably from 2 to 4, fuel gas generation and carbon dioxide separation units connected continuously, each of which contains the water gas shift reaction furnace and the zeolite membrane module containing a zeolite membrane for removing carbon dioxide, by which an unreacted raw material gas contained in the fuel gas rich in hydrogen generated in the respective units is reacted in the water gas shift reaction furnace in the next unit, and carbon dioxide formed in the units is recovered. According to the invention, gas cooling (heat exchanger) for removing carbon dioxide ($CO_2$) in an ordinary carbon dioxide absorption process is not required, a regeneration process of an absorbent necessary in the carbon dioxide absorption process is not used, and the reaction conversion of the water gas shift reaction may be enhanced by the plural combinations connected continuously, each of which contains the water gas shift reaction furnace and the zeolite membrane module containing a zeolite membrane for removing carbon dioxide. Furthermore, the fuel gas formed through gasification of coal may be enriched by separating carbon dioxide ($CO_2$) still at a high temperature and may be fed to a gas turbine.

In the integrated coal gasification combined cycle power generation facility containing the carbon dioxide membrane separation system in a fuel gas production process of the invention, the fuel gas rich in hydrogen in a high temperature and high pressure condition discharged from the zeolite membrane module of the fuel gas generation and carbon dioxide separation unit of the final step is fed to a gas turbine of the electric power generation facility while maintaining the temperature and pressure condition.

According to the integrated coal gasification combined cycle power generation, facility of the invention, energy may be efficiently used, and the power generation cost with a coal fuel may be largely reduced.

A representative example of the kind of the zeolite membrane for removing carbon dioxide used in the zeolite membrane module of the carbon dioxide membrane separation system in a coal gasification process of the invention is Y-type (FAU-type), and a particularly preferred example thereof is a composite zeolite membrane formed on a support, such as porous alumina, which contains a zeolite membrane having an oxygen 12-membered ring structure having on the surface thereof a zeolite membrane having an oxygen 8-membered ring structure. The use of the zeolite membrane provides a mechanism capable of performing selective separation in such a manner that carbon dioxide is preferentially adsorbed on the surface of the zeolite membrane due to the larger adsorption power of the zeolite species to carbon dioxide as compared to other kinds of gas, such as hydrogen, and thus carbon dioxide permeates by diffusion and transfer through the pores of the membrane toward the secondary side of the membrane, whereas the other kinds of gas are difficult to enter the pores of the membrane since the pores are filled with carbon dioxide molecules.

The composite zeolite membrane used in the zeolite membrane module of the carbon dioxide membrane separation system of the invention will be described.

Examples of the porous support used in the composite zeolite membrane include porous materials of alumina, silica, cordierite, zirconia, titania, vycor glass and a sintered metal, but the support is not limited thereto, and various porous materials may be used. The shape of the porous support is generally a tubular shape or a plate shape. The pore diameter of the porous support is generally from 0.01 to 5 µm and preferably from 0.05 to 2 µm.

The zeolite membrane having an oxygen 12-membered ring structure may be formed, for example, by coating a suspension aqueous solution of zeolite powder (seed crystals) on the surface of the porous support, then drying the solution at a prescribed temperature, and then performing hydrothermal synthesis.

The kind of zeolite used as the raw material is not particularly limited, and examples thereof include Y-type zeolite (FAU), β-type zeolite (BEA) and mordenite (MOR). The coating method for forming the zeolite membrane is not particularly limited, and a rubbing method and a dipping method are preferred.

In the rubbing method, the zeolite powder suspension liquid is rubbed into the surface of the porous support and then dried depending on necessity, thereby coating the zeolite powder (seed crystals) uniformly.

In the dipping method, the porous support is immersed in the zeolite powder suspension liquid, thereby coating the zeolite powder (seed crystals) on the surface uniformly.

The zeolite powder is coated and dried, and then subjected to hydrothermal synthesis, and the zeolite membrane may be formed through the hydrothermal synthesis from the zeolite powder coated on the porous support. The temperature on the hydrothermal synthesis is not particularly limited and is preferably from 80 to 300° C. from the standpoint of uniform formation of the zeolite membrane on the porous support, and the reaction time is generally from 2 to 720 hours, and preferably from 6 to 173 hours.

The composite zeolite membrane in the invention contains a zeolite membrane having an oxygen 12-membered ring structure formed on a support, such as porous alumina, having provided on a surface thereof a zeolite membrane having an oxygen 8-membered ring structure, as described above.

In the zeolite membrane module of the carbon dioxide membrane separation system of the invention, the mixed gas to be separated is preferably in a turbulent flow state as much as possible on feeding to the tubular membrane element, and such a structure is preferred that a double tube structure is formed by providing an outer tube outside the tubular membrane element to form a pair, and the mixed gas flows in a gap between the membrane element and the outer the at a flow rate of 10 m/s or more (see, Patent Literature JP-A-2009-39654).

In the composite zeolite membrane used in the zeolite membrane module of the carbon dioxide membrane separation system of the invention, it is preferred that the zeolite membrane having an oxygen 12-membered ring structure is constituted by an FAU-type zeolite membrane, and the zeolite membrane having an oxygen 8-membered ring structure is constituted by a CHA-type zeolite or an MER-type zeolite membrane, and preferably a CHA-type zeolite.

The Y-type zeolite (FAU) is zeolite that has the same crystalline structure as faujasite, which is natural zeolite, and is known to be formed of polygons containing an oxygen 12-membered ring, and it is known that the oxygen 12-membered ring has a pore diameter of 0.74 nm, and a molecule of approximately 0.95 nm may be pass through the pores due to the molecular vibration.

The CHA-type zeolite is known to be a zeolite whose pores are formed of polygons containing an oxygen 8-membered ring, and the oxygen 8-membered ring has a pore diameter of 0.38 nm. The CHA-type zeolite having these structural characteristics has a relatively small pore diameter among various kinds of zeolite.

In the composite zeolite membrane used in the zeolite membrane module of the carbon dioxide membrane separation system of the invention, the thickness of the zeolite membrane having an oxygen 12-membered ring structure before subjecting to the conversion treatment is desirably 10 μm or less, and preferably from 0.1 to 10 μm, for ensuring a high membrane permeability. The thickness oz the zeolite layer having an oxygen 8-membered ring structure after conversion is preferably 10 nm or more from the standpoint of durability, and is preferably 2 μm or less from the standpoint of the membrane permeability.

The molecular size of carbon dioxide ($CO_2$) is 0.33 nm. The method for producing the composite zeolite membrane used in the zeolite membrane module may contain, for example, immersing a zeolite membrane having an oxygen 12-membered ring structure formed on a support in an alkali aqueous solution having zeolite powder having an oxygen 12-membered ring structure added thereto, and subjecting to a heat and pressure treatment under prescribed conditions, so as to convert a part of the surface of the zeolite membrane having an oxygen 12-membered ring structure formed on the support to a zeolite membrane having an oxygen 8-membered ring structure, thereby providing a composite zeolite membrane containing a zeolite membrane having an oxygen 12-membered ring structure having on a surface thereof a zeolite membrane having an oxygen 8-membered ring structure.

In the method for producing the composite zeolite membrane, it is preferred that the zeolite membrane having an oxygen 12-membered ring structure formed on a support is immersed in a potassium hydroxide aqueous solution of from 0.01 to 3 mol/L, preferably from 0.1 to 1 mol/L, having zeolite powder having an oxygen 12-membered ring structure added thereto in a ratio of from 0.01 to 20 wt %, preferably from 1 to 10 wt %, and subjecting to a heat and pressure treatment under conditions of a temperature of from 80 to 150° C., preferably from 95 to 125° C., and a pressure of from 0.05 to 2 MPa, preferably from 0.1 to 1 MPa, for from 1 to 120 hours, preferably from 6 to 36 hours.

In the method for producing the composite zeolite membrane, it is particularly preferred that the zeolite membrane having an oxygen 12-membered ring structure is constituted by an FAU-type zeolite membrane, and the zeolite membrane having an oxygen 8-membered ring structure is constituted by a CHA-type zeolite membrane.

As described above, a surface of an FAU-type zeolite membrane formed on a support, such as a porous alumina tube, is converted to a zeolite membrane having an oxygen 8-membered ring structure, and thereby the zeolite membrane having an oxygen 8-membered ring structure may be largely reduced in thickness as compared to an ordinary synthesis method, thereby synthesizing a composite zeolite membrane having a molecular sieve function imparted thereto.

In particular, only the surface of the FAU membrane formed on the support is converted to the 8-membered ring zeolite, thereby ensuring the molecular sieve function while maintaining the high membrane permeability. For maintaining the higher membrane permeability, the thickness of the FAU-type zeolite membrane before subjecting to the conversion treatment is desirably from 0.1 to 10 μm. The thickness of the CHA-type zeolite layer having an oxygen 8-membered ring structure after conversion is preferably 10 nm or more from the standpoint of durability, and is preferably 2 μm or less from the standpoint of the membrane permeability.

The thickness of the zeolite layer may be measured by observing the cross section thereof with an electron microscope, or by grinding and removing a layer with a prescribed thickness from the surface of the zeolite layer and then measuring the XRD (X-ray diffraction) pattern thereof.

EXAMPLE

Examples of the invention will be described below, but the invention is not limited to the examples.

Example 1

Finely pulverized coal is introduced firstly to a pyrolysis furnace (which is not shown in the FIGURE). In the pyrolysis furnace, coal is pyrolyzed by mixing with a high temperature gas generated in a high temperature gas generation furnace, and thereby a pyrolyzed gas, an oil and a char are formed as pyrolyzed products. The char thus formed is separated from the gas and the oil with a cyclone.

As shown in FIG. 1, the whole or a part of the char thus separated is gasified (partial oxidation) with oxygen gas in a high temperature gas generation furnace (gasification furnace) and thus is converted to a high temperature gas (which contains hydrogen and carbon monoxide as major components). The high temperature gas is then introduced to a water gas shift reaction furnace, and carbon monoxide (CO) is converted to hydrogen ($H_2$) and carbon dioxide ($CO_2$) through water gas shift reaction.

In the carbon dioxide membrane separation system in a coal gasification process according to the invention, a mixed gas of hydrogen ($H_2$) and carbon dioxide ($CO_2$) in a high temperature and high pressure condition generated through water gas shift reaction from a water gas shift reaction furnace is introduced, while maintaining the temperature and pressure condition, to a zeolite membrane module containing a zeolite membrane for removing carbon dioxide, thereby removing carbon dioxide and generating a fuel gas rich in hydrogen.

Specifically, the mixed gas of hydrogen ($H_2$) and carbon dioxide ($CO_2$) after reaction discharged from the water gas shift reaction furnace is in a condition approximately of a pressure of from 2 to 4 MPa and a temperature of from 200 to 400° C., and is directly fed to the zeolite membrane module, thereby removing carbon dioxide ($CO_2$) and generating a fuel gas rich in hydrogen.

Accordingly, a fuel gas rich in hydrogen can be fed, as a fuel having a high temperature maintained, to a gas turbine. Furthermore, the gas having a high pressure ensures a differential pressure providing a driving force even though the permeation side of the membrane is in the atmospheric pressure, and thus there is no need of motive energy, such as a pump or a compressor.

The electric power generation method of the power generation facility in this case is preferably combined cycle power generation (including both a gas turbine and a steam turbine), which is easily transferred to a low load operation and exhibits a high power generation efficiency thereon.

In this example, the composite zeolite membrane used in the zeolite membrane module of the carbon dioxide membrane separation system of the invention was produced in the following manner.

A suspension aqueous solution of FAU-type zeolite powder (seed crystals) (produced by Tosoh Corporation) was coated and dried on a porous alumina tube (substrate) (produced by Ritz Hitachi Zosen Corporation), and the subjected to hydrothermal synthesis at a temperature of 100° C. for 4.75 hours, thereby synthesizing an FAU-type zeolite membrane. The thickness of the FAU-type zeolite membrane on the surface of the porous alumina tube before subjecting to a conversion treatment was approximately 2 μm.

Subsequently, a composite zeolite membrane was produced through a conversion treatment of the zeolite membrane in the following manner.

Specifically, in an autoclave, the FAU-type zeolite membrane having an oxygen 12-membered ring structure formed on a support formed of the porous alumina tube was immersed in a potassium hydroxide aqueous solution of 0.5 mol/L having FAU-type zeolite powder added thereto in a ratio of 10 wt %, and subjected to a heat and pressure treatment by allowing to stand under conditions of a temperature of 95° C. and a pressure of 0.1 MPa for 24 hours, so as to convert the surface of the FAU-type zeolite membrane formed on the support to a CHA-type zeolite membrane having an oxygen 8-membered ring structure, thereby forming a composite zeolite membrane containing the FAU-type zeolite membrane having formed on the surface thereof the CHA-type zeolite membrane.

In the composite zeolite membrane used in the zeolite membrane module, only the surface of the FAU-type zeolite membrane having an oxygen 12-membered ring structure formed on the porous alumina tube (substrate) was converted to the CHA-type zeolite membrane having an oxygen 8-membered ring structure, and thereby a zeolite membrane having a function of removing carbon dioxide imparted thereto was synthesized while maintaining the high membrane permeability. The thickness of the zeolite layer having an oxygen 8-membered ring structure thus converted was expected to be from 0.01 to 1 μm, and thus the CHA-type zeolite membrane layer having an oxygen 8-membered ring structure was largely reduced in thickness.

In the zeolite membrane module of the carbon dioxide membrane separation system of this example, the mixed gas to be separated is preferably in a turbulent flow state as much as possible on feeding to the tubular membrane element. The zeolite membrane module had, for example, such a structure that a double tube structure is formed by providing an outer tube outside the tubular membrane element to form a pair, and the mixed gas flowed in a gap between the membrane element and the outer tube at a flow rate of 10 m/s or more.

Example 2

A carbon dioxide membrane separation system in a coal gasification process of this example contained three fuel gas generation and carbon dioxide separation units connected continuously, each of which contained the water gas shift reaction furnace and the zeolite membrane module containing a zeolite membrane for removing carbon dioxide according to Example 1, by which an unreacted raw material gas contained in the fuel gas rich in hydrogen generated in the respective units was reacted in the water gas shift reaction furnace in the next unit, and carbon dioxide formed in the units was recovered.

By connecting the zeolite membrane module to the outlet of the water gas shift reaction furnace, and furthermore providing thereafter the combination of the water gas shift reaction furnace and the zeolite membrane module, reaction of the unreacted gas is facilitated due to the less proportion of carbon dioxide ($CO_2$), and thus the equilibrium state is shifted. Accordingly, the reaction conversion to a fuel gas was enhanced, and thus the effective utilization of a coal fuel was improved.

In the integrated coal gasification combined cycle power generation facility containing the carbon dioxide membrane separation system in a fuel gas production process of the invention, the fuel gas rich in hydrogen in a high temperature and high pressure condition discharged from the zeolite membrane module of the fuel gas generation and carbon dioxide separation unit of the final step was fed to a gas turbine of the electric power generation facility while maintaining the temperature and pressure condition.

According to the integrated coal gasification combined cycle power generation facility of this example, energy was efficiently used, and the power generation cost with a coal fuel was largely reduced.

The invention claimed is:

1. A carbon dioxide membrane separation system in a coal gasification process, comprising:
    a gasification furnace for generating hydrogen and carbon monoxide which are introduced into a water gas shift reaction furnace;
    the water gas shift reaction furnace for generating a mixed gas of hydrogen ($H_2$) and carbon dioxide ($CO_2$) in a high temperature and high pressure condition generated through water gas shift reaction and introducing the mixed gas directly, while maintaining the temperature and pressure condition, to a zeolite membrane module;
    the zeolite membrane module containing a zeolite membrane for removing carbon dioxide, thereby removing carbon dioxide and generating a fuel gas rich in hydrogen.

2. An integrated coal gasification combined cycle power generation facility comprising the carbon dioxide membrane separation system in a coal gasification process according to claim 1, wherein the fuel gas rich in hydrogen in a high temperature and high pressure condition discharged from the zeolite membrane module is fed to a gas turbine of the power generation facility while maintaining the temperature and pressure condition.

3. A carbon dioxide membrane separation system in a fuel gas production process, comprising plural fuel gas generation and carbon dioxide separation units connected continuously, each of which contains the water gas shift reaction furnace and the zeolite membrane module containing a zeolite membrane for removing carbon dioxide according to claim 1, by which an unreacted raw material gas contained in the fuel gas rich in hydrogen generated in the respective units is reacted in the water gas shift reaction furnace in the next unit, and carbon dioxide formed in the units is recovered.

4. An integrated coal gasification combined cycle power generation facility comprising the carbon dioxide membrane separation system in a coal gasification process according to claim 3, wherein the fuel gas rich in hydrogen in a high temperature and high pressure condition discharged from the zeolite membrane module of the fuel gas generation and carbon dioxide separation unit of the final step is fed to a gas turbine of the power generation facility while maintaining the temperature and pressure condition.

5. A carbon dioxide membrane separation system in a coal gasification process according to claim 1, wherein the zeolite membrane is a composite zeolite membrane.

6. A carbon dioxide membrane separation system in a coal gasification process according to claim 1, wherein the zeolite membrane is a composite zeolite membrane formed on a porous support, which contains a zeolite membrane having an oxygen 12-membered ring structure having on the surface thereof a zeolite membrane having an oxygen 8-membered ring structure.

7. A carbon dioxide membrane separation system in a coal gasification process according to claim 6, wherein the zeolite membrane having an oxygen 12-membered ring structure is constituted by an FAU-type zeolite membrane, and the zeolite membrane having an oxygen 8-membered ring structure is constituted by a CHA-type zeolite, MER-type zeolite or CHA-type zeolite membrane.

* * * * *